United States Patent
Richardson et al.

(10) Patent No.: US 11,480,847 B1
(45) Date of Patent: Oct. 25, 2022

(54) SPECTRAL CONTROL OF SUPERCONTINUUM LIGHT

(71) Applicant: University of Central Florida Research Foundation, Inc., Orlando, FL (US)

(72) Inventors: Martin Richardson, Orlando, FL (US); Patrick Roumayah, Orlando, FL (US); Justin Cook, Orlando, FL (US); Soumya Sarang, Orlando, FL (US); Robert Bernath, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 0 days.

(21) Appl. No.: 17/553,273

(22) Filed: Dec. 16, 2021

Related U.S. Application Data

(60) Provisional application No. 63/279,474, filed on Nov. 15, 2021.

(51) Int. Cl.
  *G02F 1/35* (2006.01)
  *G02F 1/383* (2006.01)
  *H01S 3/067* (2006.01)

(52) U.S. Cl.
  CPC ............. *G02F 1/3528* (2021.01); *G02F 1/383* (2013.01); *H01S 3/06754* (2013.01)

(58) Field of Classification Search
  CPC .................................................... G02F 1/3528
  See application file for complete search history.

(56) References Cited

U.S. PATENT DOCUMENTS 8,054,537 B2 * 11/2011 Okuno ................. G02F 1/3513
  359/341.1
10,584,999 B2 * 3/2020 Protopopov .......... G01J 3/0245

FOREIGN PATENT DOCUMENTS

WO  WO-2021121529 A1 *  6/2021
WO  WO-2021121530 A1 *  6/2021

OTHER PUBLICATIONS

D. Kergoustin, et al., "Multi-octave light source with tunable spectral profile: from supercontinuum to Raman comb spectral-structure ," in 2019 Conference on Lasers and Electro-Optics Europe and European Quantum Electronics Conference, OSA Technical Digest (Optica Publishing Group, 2019). (Year: 2019).*
B. Zhang, et al., "High-power near-infrared linearly-polarized supercontinuum generation in a polarization-maintaining Yb-doped fiber amplifier," Opt. Express 23, 28683-28690 (2015).
(Continued)

*Primary Examiner* — Rhonda S Peace
(74) *Attorney, Agent, or Firm* — Suiter Swantz pc llo

(57) ABSTRACT

A supercontinuum source may include a seed source providing seed light, where the seed source includes one or more seed lasers to generate the seed light and a seed controller to adjust at least one of a temporal pulse profile or a wavelength of the seed light. The supercontinuum source may further include an optical fiber to receive the seed light, where the seed source pumps the optical fiber to induce the generation of supercontinuum output light, and where a spectrum of the supercontinuum output light is controllable by adjusting at least one of the temporal pulse profile or the wavelength of the seed light with the seed controller.

44 Claims, 7 Drawing Sheets

(56) References Cited

OTHER PUBLICATIONS

G. Lopez-Galmiche, et al., "Visible supercontinuum generation in a graded index multimode fiber pumped at 1064 nm," Opt. Lett. 41, 2553-2556 (2016).

K. Krupa, et al., "Spatiotemporal characterization of supercontinuum extending from the visible to the mid-infrared in a multimode graded-index optical fiber". Opt Lett. Dec. 15, 2016;41(24):5785-5788. doi: 10.1364/OL.41.005785. PMID: 27973502.

K. Krupa,"Observation of Geometric Parametric Instability Induced by the Periodic Spatial Self-Imaging of Multimode Waves", <i>Physical Review Letters</i>, vol. 116, No. 18, 2016. doi:10.1103/PhysRevLett.116.183901.

L. G. Wright, et al., "Self-organized instability in graded-index multimode fibres". Nature Photon 10, 771-776 (2016). https://doi.org/10.1038/nphoton.2016.227.

L. G. Wright, et al., "Ultrabroadband Dispersive Radiation by Spatiotemporal Oscillation of Multimode Waves". Phys. Rev. Lett. 115, 223902—Published Nov. 25, 2015.

M. A. Eftekhar, et al., "Accelerated nonlinear interactions in graded-index multimode fibers". Nat Commun 10, 1638 (2019). https://doi.org/10.1038/s41467-019-09687-9.

P. B. Corkum et al.,"Supercontinuum Generation in Gases" Physical Review Letter, 57, 2268 (1986). doi:10.1103/PhysRevLett.57.2268.

P. Roumayah, et al., "High average power pulsed multi-mode Raman fiber laser in graded index fiber" SPIE Photonics West, San Francisco, CA, Fiber Lasers XV: Technology and Systems, 105121X.

R. R. Alfano et al., "Emission in the region 4000 to 7000 A via four-photon coupling in glass," Phys. Rev. Lett. 24(11), 584-587(1970).

S. Arun, et al., "Power Combined, Octave-spanning, CW Supercontinuum using Standard Telecom Fib with Output Power of 70W", Centre for Nano Science and Engineering, Indian Institute of Science, 2018, 2 pages.

S. Longhi. (2004). Modulational instability and space-time dynamics in nonlinear parabolic-index optical fibers. Optics letters 28.2363-5. 10.1364/OL.28.002363.

U. Teğin, et al., Cascaded Raman scattering based high power octave-spanning supercontinuum generation in graded-index multimode fibers. Sci Rep 8, 12470 (2018). https://doi.org/10.1038/s41598-018-30252-9.

W. Smith, et al., (1977). Superbroadening in H2O and D2O by self-focused picosecond pulses from a YAIG:Nd laser. Physical Review A. 15. 2396-2403. 10.1103/PhysRevA.15.2396.

W. Werncke et al.(1972). An anomalous frequency broadening in water. Optics Communications, 4, 413-415.

W. Yu, "Spectral broadening of picosecond 1.06 u pulse in KBr", <i>Optics Communications</i>, vol. 14, No. 3, pp. 344-347, 1975. doi:10.1016/0030-4018(75)90333-8.

\* cited by examiner

SPECTRAL CONTROL OF SUPERCONTINUUM LIGHT

CROSS-REFERENCE TO RELATED APPLICATION

The present application claims the benefit under 35 U.S.C. § 119(e) of U.S. Provisional Application Ser. No. 63/279,474, filed Nov. 15, 2021, entitled SPECTRAL CONTROL OF SUPERCONTINUUM LIGHT, naming Martin Richardson, Patrick Roumayah, Justin Cook, Soumya Sarang, and Robert Bernath as inventors, which is incorporated herein by reference in the entirety.

GOVERNMENT LICENSE RIGHTS

This invention was made with Government support under Grant No. FA9550-15-1-0041 awarded by the US Air Force Office of Scientific Research (AFOSR). The Government has certain rights in this invention.

TECHNICAL FIELD

The present disclosure relates generally to supercontinuum generation and, more particularly, to supercontinuum generation using shaped pulses.

BACKGROUND

High brightness supercontinuum or white light sources are desirable for a wide range of applications including sensing, spectroscopy, material characterization, and as broadband illumination sources. However, existing techniques for the generation of supercontinuum light typically require photonic crystal fibers, ultrashort pulses, or feedback mechanisms that prevent power scaling and/or limit the applications to laboratory environments. There is therefore a need to develop systems and methods for curing the above deficiencies.

SUMMARY

A supercontinuum source is disclosed in accordance with one or more illustrative embodiments of the present disclosure. In one illustrative embodiment, the supercontinuum source includes a seed source providing seed light, where the seed source includes one or more seed lasers to generate the seed light and a seed controller to adjust at least one of a temporal pulse profile or a wavelength of the seed light. In another illustrative embodiment, the supercontinuum source includes an optical fiber to receive the seed light, where the seed source pumps the optical fiber to induce the generation of supercontinuum output light, and where a spectrum of the supercontinuum output light is controllable by adjusting at least one of the temporal pulse profile or the wavelength of the seed light with the seed controller.

A supercontinuum source is disclosed in accordance with one or more illustrative embodiments of the present disclosure. In one illustrative embodiment, the supercontinuum source includes a seed source providing seed light with a selectable temporal pulse profile, where the seed source includes one or more seed lasers to generate the seed light and a seed controller to adjust the temporal pulse profile of at least one of the one or more seed lasers. In another illustrative embodiment, the supercontinuum source includes an optical fiber to receive the seed light, where the seed source pumps the optical fiber to induce the generation of supercontinuum output light, and where a spectrum of the supercontinuum output light is controllable by adjusting the temporal profile of the at least one of the one or more seed lasers with the seed controller.

A supercontinuum source is disclosed in accordance with one or more illustrative embodiments of the present disclosure. In one illustrative embodiment, the supercontinuum source includes a seed source providing seed light within two or more spectral ranges, where the seed source includes one or more seed lasers to generate the seed light and a seed controller to adjust a relative ratio of the seed light within the two or more spectral ranges. In another illustrative embodiment, the supercontinuum source includes an optical fiber to receive the seed light, where the seed source pumps the optical fiber to induce the generation of supercontinuum output light, and where a spectrum of the supercontinuum output light is controllable by adjusting the relative ratio of the seed light within the two or more spectral ranges with the seed controller.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1A:
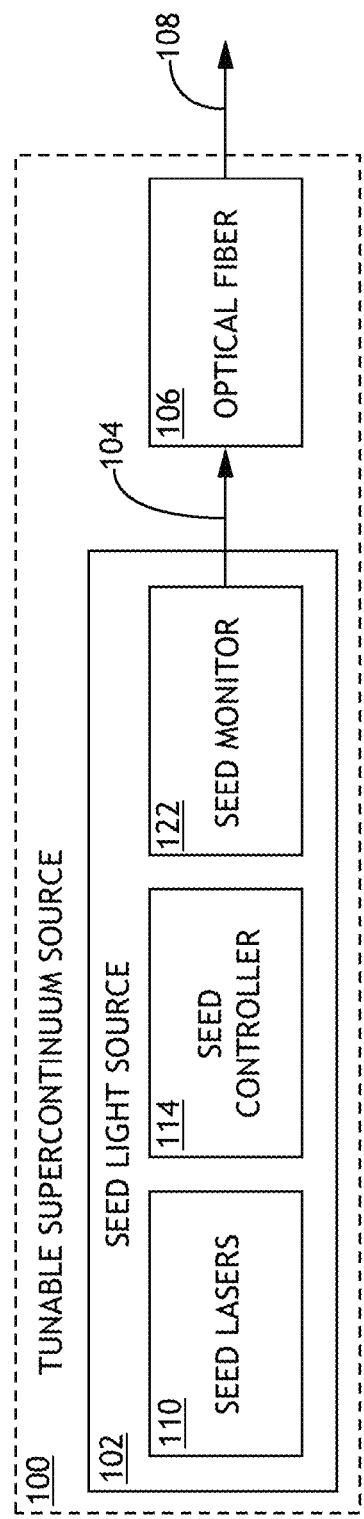
FIG. 1A is a conceptual block diagram of a tunable supercontinuum source, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for generating and controlling the spectrum of high-brightness supercontinuum light. For the purposes of the present disclosure, the terms supercontinuum light, white light, and broadband light are used interchangeably.

White light or supercontinuum sources are widely used in many applications including, but not limited to, remote sensing, illumination, sensor dazzling, and laboratory material characterization. For every application that uses white light, there is typically at least some benefit to having either a flat or controllable spectrum. As an illustration in the context of recreational illumination (e.g., laser light shows, or the like), controlling the spectrum in the visible domain affects the apparent color of the beam. As an illustration in the context of military illumination, arbitrary control of the spectrum would allow for a single source to illuminate a target or object of interest with either white light for conventional visibility or infrared (IR) light for viewing on an appropriate camera without revealing the illumination source to human eyes. As an illustration in the context of sensing in either remote or laboratory situations, different classes of materials will relate to different spectral regions for identification. As an illustration in the context of sensor dazzling, the camera or sensor on the threat (e.g., a drone, a missile, or the like) may be protected against certain (e.g., conventional) spectral ranges. As a result, broad, flat spectral illumination may overcome many such protections.

Some embodiments of the present disclosure are directed to generating high-brightness supercontinuum light in a fiber, where the spectral properties of the supercontinuum output light are controllable by adjusting various properties of seed light including, but not limited to, a temporal profile of the seed light (e.g., a pulse duration and/or intensity profile of the seed light) or a spectrum of the seed light.

It is contemplated herein that optical fibers provide many properties favorable for the generation of high-power, broad-bandwidth supercontinuum light such as, but not limited to, customizable dispersion, confined emission, and long interaction wavelengths limited only by the length of the fiber. Supercontinuum generation in optical fibers is typically achieved by either pumping an optical fiber with high powers above a zero-dispersion wavelength (ZDW) of the optical fiber or by inducing cascaded Raman shifts to generate light beyond the ZDW, which leads to spectral broadening through modulation instability and other nonlinearities (e.g., self-phase modulation (SPM), cross-phase modulation (XPM), or the like).

Previous efforts for supercontinuum generation have typically sought to promote these various nonlinearities through either selection of the nonlinear medium (e.g., the optical fiber) or maximizing the peak power of seed pulses to facilitate nonlinear interactions. For example, photonic crystal fibers (PCFs) provide unique dispersion flexibility and graded-index fibers (GIFs) facilitate complex multi-modal interactions and spatio-temporal instabilities that lead to spectral broadening. Further, previous studies on supercontinuum generation have typically utilized either ultrashort seed pulses on the order of femtoseconds to tens of picoseconds with high peak powers or continuous-wave seed light to facilitate nonlinear interactions. Efforts at supercontinuum generation using such techniques are generally described in G. Lopez-Galmiche, et al., Opt. Lett. 41, 2553-2556 (2016), U. Teğin, et al., Scientific Reports 8, 12470 (2018), and K. Krupa, et al., Opt. Lett. 41, 5785-5788 (2016), all of which are incorporated herein by reference in their entirety.

However, it is contemplated herein that existing techniques for supercontinuum generation in optical fibers suffer from various limitations. For example, previous techniques are typically limited to laboratory environments due to reliance on fragile materials such as PCFs and/or precise handling and alignment requirements. Further, fragile microstructures used in previous techniques typically require specialty manufacturing techniques. As another example, previous techniques generally provide insufficient power for many practical applications in part due to the use of ultrashort seed pulse trains with relatively low average power. Further, the spectral properties of generated supercontinuum light are typically highly dependent on the particular system design and are thus typically fixed or relatively inflexible for a given system.

Embodiments of the present disclosure are directed to systems and methods for dynamic spectral control of supercontinuum light based on controlling the temporal and/or spectral properties of seed light. Embodiments of the present disclosure are further directed to systems and methods for generating tailored supercontinuum light with an architecture suitable for high power scaling. In this way, supercontinuum light with average powers on the order of hundreds of Watts or higher may be generated.

In some embodiments, the spectral properties of supercontinuum light are tailored by controlling a temporal profile of the seed light. It is contemplated herein that the Raman effect induced by seed light in an optical fiber is directly related to instantaneous power of the seed light and the associated instantaneous intensity-dependent perturbations to the electronic structure of molecules in the optical fiber. Tailoring a temporal profile of the seed light (e.g., tailoring a pulse shape of pulsed seed light) may thus provide a mechanism for controlling the relative amount of light contributing to various nonlinear processes that lead to spectral broadening. For example, adjusting a temporal profile of seed light with a wavelength below the ZDW of an optical fiber may provide temporal control over the relative amount of light contributing to cascaded Raman effects and may thus provide temporal control over the associated instabilities and nonlinearities associated with spectral broadening. Further, in some embodiments, the relative amplitudes and/or temporal profiles of pulses within a train or burst of seed light pulses are separately controlled. In this way, precise control of the spectral properties of supercontinuum light over multiple pulses may be achieved.

In some embodiments, the spectral properties of supercontinuum light are tailored by simultaneously utilizing seed light within multiple spectral ranges. In this way, the spectrum of the generated supercontinuum within different spectral ranges may be separately controlled. For example, it is typically the case that spectral broadening of the seed pulses from seed light at a particular wavelength generates an uneven power spectral density at different wavelengths or wavelength ranges. However, additional seed light with different wavelengths may supplement the spectrum of the generated supercontinuum light to provide a desired spectral profile such as, but not limited to, a flat spectral profile. By way of another example, seed light in multiple wavelength regions may facilitate the generation of broad supercontinuum beyond the capabilities of a single-wavelength seed.

Additional embodiments of the present disclosure are directed to dynamic control of the spectral properties through dynamic adjustments of the seed light. In some embodiments, a supercontinuum light source includes an adjustable seed source capable of dynamic adjustments of the seed light. For example, an adjustable seed source may provide dynamic pulse shaping of seed pulses through any technique known in the art such as, but not limited to, direct gain modification (e.g., of diode lasers) or intensity modulators (e.g., acousto-optic modulators, electro-optic modulators, or the like). By way of another example, an adjustable seed source may provide dynamic modifications of the spectral content of seed light. For instance, an adjustable seed source may include two or more light sources providing light in different wavelength ranges, where the combined spectral output from the multiple sources is adjustable. In another instance, an adjustable seed source may include a seed laser and one or more nonlinear crystals to generate harmonics of the seed source, where the relative strengths of the seed light and the harmonics are adjustable.

Further embodiments of the present disclosure are directed to scalable architectures for tailored supercontinuum generation. It is contemplated herein that highly scalable supercontinuum generation with tunable spectral properties may be achieved by increasing the pulse duration and scaling the pulse energy of seed pulses relative to conventional techniques utilizing ultrashort seed pulses as described previously herein. As a non-limiting illustration, seed pulses having pulse durations on the order of picoseconds to tens or hundreds of nanoseconds may be well-suited for high-power supercontinuum generation. For example, various laser technologies exist to generate high-average-power pulse trains in this regime with pulse energies on the order of milliJoules, which may in turn provide high average power supercontinuum output. Additionally, advances in high power fiber laser technology may be applied to provide efficient pumping and cooling required for high power applications. Further, extending the pulse duration may provide additional flexibility for tailoring the spectrum of the supercontinuum through pulse shaping.

Referring now to FIGS. 1A-4, systems and methods for tailored supercontinuum generation are described in greater detail in accordance with one or more embodiments of the present disclosure.

FIG. 1A is a conceptual block diagram of a tunable supercontinuum source 100, in accordance with one or more embodiments of the present disclosure.

In some embodiments, the tunable supercontinuum source 100 includes a seed light source 102 to generate seed light 104 and an optical fiber 106 operating as a nonlinear medium for the generation of supercontinuum output light 108 from the seed light 104, where the tunable supercontinuum source 100 may selectively adjust various properties of the seed light 104 to tailor the spectral content of the supercontinuum output light 108.

The optical fiber 106 may be formed from any material suitable for operating as a nonlinear medium for the generation of the supercontinuum output light 108 from the seed light 104. In some embodiments, the optical fiber 106 is formed from silica which may be doped or undoped. For example, dopants such as, but not limited to, germanium or rare-earth elements may be added to the optical fiber 106 to increase nonlinearity. However, it is to be understood that dopants are not required.

The optical fiber 106 may further be provided in any design or form factor suitable for guiding the seed light 104 and the generated supercontinuum output light 108 such as, but not limited to, a step-index fiber (SIF), a GIF, a PCF, or any other specialized fiber design. Further, the optical fiber 106 may support any number of modes for the seed light 104 or the supercontinuum output light 108 and may support any pumping scheme known in the art. For example, the optical fiber 106 may include a SIF pumped by core or cladding pumping. As another example, the optical fiber 106 may include a core-pumped GIF. In a general sense, it is contemplated herein that the material, design, and/or the pumping scheme may be selected based on the particular needs of a selected application.

The seed light source 102 may include any type of seed source known in the art suitable for generating supercontinuum output light 108 in the optical fiber 106. In this way, the seed light source 102 and the optical fiber 106 may be co-selected for a particular application or desired properties of the supercontinuum output light 108. In some embodiments, the seed light source 102 includes a fiber laser. In this way, the seed light 104 may be directly coupled to the optical fiber 106 through fiber-based techniques. In some embodiments, the seed light source 102 includes a free-space laser such that the seed light 104 may be coupled to the optical fiber 106 using free-space optical elements.

The seed light source 102 may generate seed light 104 with any wavelength, wavelength range, or combination of wavelength ranges suitable for inducing or supporting supercontinuum generation in the optical fiber 106 through any physical mechanism. In some embodiments, the seed light source 102 generates seed light 104 with wavelengths above a ZDW of the optical fiber 106 to induce modulation instability or other nonlinearities that lead to spectral broadening. In some embodiments, the seed light source 102 generates seed light 104 with wavelengths below the ZDW but with sufficient power to initiate cascaded Raman scattering to generate wavelengths that pass the ZDW to induce spectral broadening.

The seed light source 102 may generate seed light 104 with any temporal profile. For example, the seed light source 102 may generate pulsed seed light 104 with any pulse duration such as, but not limited to, femtosecond pulses, picosecond pulses, or nanosecond pulses. As described in greater detail herein, it may be advantageous to provide seed light 104 with pulse durations of picosecond or greater to allow for dynamic control of the spectrum of the supercontinuum output light 108 through pulse shaping. However, it is to be understood that pulse durations of any duration are within the spirit and scope of the present disclosure. By way of another example, the seed light source 102 may generate pulsed seed light 104 with any repetition rate including, but not limited to, repetition rates ranging from MHz to kHz. By way of another example, the seed light source 102 may generate pulsed seed light 104 with any pulse energy including, but not limited to, microJoules or milliJoules. By way of another example, the seed light source 102 may generate pulsed seed light 104 in bursts of any number of pulses. Further, the amplitudes and/or temporal profiles of the pulses within a train or burst of pulses may be separately controlled to provide additional control over the spectrum of supercontinuum output light 108.

As a non-limiting illustration, a seed light source 102 such as, but not limited to, a Yb:fiber or Nd:YAG laser providing NIR wavelength seed light 104 (e.g., at 1030 nm, 1064 nm, or the like) with milliJoule pulse energies and nanosecond pulse durations may be well-suited for generating highaverage-power supercontinuum output light 108 in a silica optical fiber 106 at least in part through cascaded Raman scattering past the ZDW wavelength (e.g., around 1300 nm).

Referring now generally to FIGS. 1A-4, techniques for dynamically tailoring spectral properties of the supercontinuum output light 108 are described in greater detail in accordance with one or more embodiments of the present disclosure.

In some embodiments, the seed light source 102 provides seed light 104 with an adjustable temporal profile (e.g., an adjustable pulse shape). In this way, control over the pulse shape of the seed light 104 may provide a mechanism for temporal control of the conditions that lead to instabilities or nonlinear interactions in the optical fiber 106 that give rise to spectral broadening and supercontinuum generation.

As an illustration, it is contemplated herein that the Raman effect may play a critical role in supercontinuum generation in an optical fiber 106. For example, cascaded Raman scattering may directly lead to increased spectral content and may further provide a mechanism for generation of wavelengths beyond the ZDW of the optical fiber 106 which may induce modulation instabilities and other nonlinear phenomena such as, but not limited to, SPM or XPM that may lead to further spectral broadening. Because the Raman effect is directly related to instantaneous power of the seed light 104, each instantaneous power level of the seed light 104 may correspond to a separate Raman shift. As a result, tailoring the pulse shape of the seed light 104 may have the effect of tailoring the temporal evolution of various instabilities and nonlinear phenomena in the optical fiber 106 and thus the resulting properties of generated supercontinuum output light 108. It is further to be understood that description of the impact of pulse shaping on the Raman effect is provided solely for illustrative purposes and should not be interpreted as limiting. In a general sense, it is to be understood that pulse shaping of the seed light 104 may generally impact a variety of nonlinear processes that lead to spectral broadening of the seed light 104 into the supercontinuum output light 108.

The temporal profile of the seed light 104 may be tailored using any technique known in the art. Further, temporal control of the seed light 104 may be applied to individual pulses or bursts of pulses of the seed light 104.

Figure 1B:
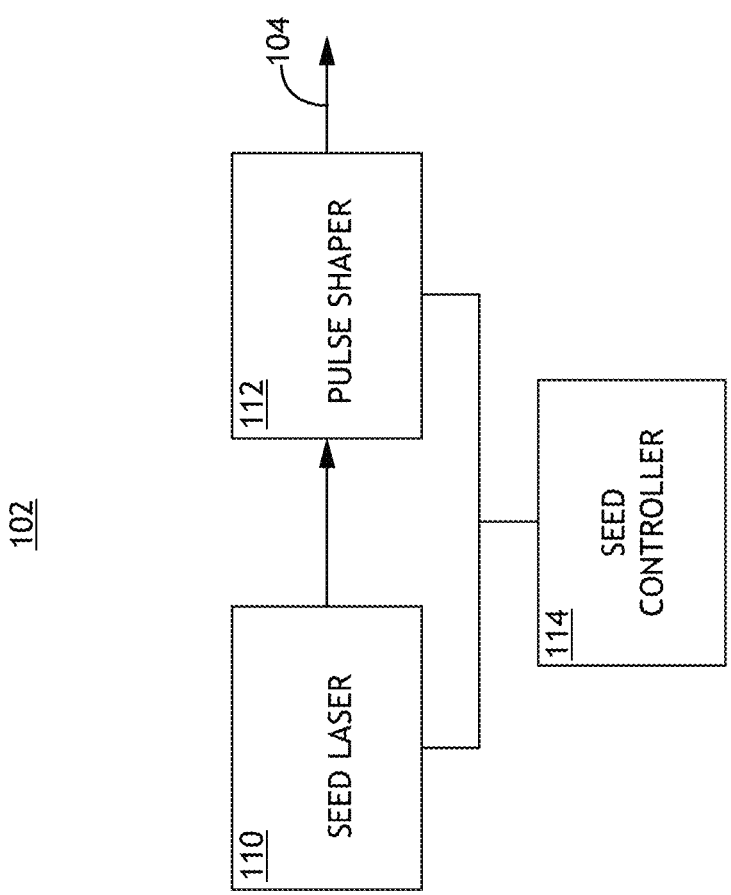
FIG. 1B is a conceptual block diagram of a seed light source including a seed laser and a pulse-shaper as separate components, in accordance with one or more embodiments of the present disclosure.

In some embodiments, the seed light source 102 includes a seed laser 110 to generate seed light 104 with a first temporal profile (e.g., pulse shape) and a pulse-shaper 112 to modify, adjust, or otherwise control the intensity of the seed light 104 to generate a second temporal profile (e.g., pulse shape) to be provided to the optical fiber 106. As an illustration, FIG. 1B is a conceptual block diagram of a seed light source 102 including a seed laser 110 and a pulse-shaper 112 as separate components, in accordance with one or more embodiments of the present disclosure. The pulse-shaper 112 may include any type of pulse shaper known in the art including, but not limited to, an acousto-optic modulator or an electro-optic modulator.

In some embodiments, the seed light source 102 includes a seed laser 110 that may be directly adjusted to provide a tailored temporal profile (e.g., pulse shape). For example, the seed laser 110 may include a diode laser that may be directly gain modulated to provide a tailored temporal profile.

Further, the seed light source 102 may include a seed controller 114 that may be communicatively coupled to the seed laser 110 and/or a pulse-shaper 112. In this way, the seed controller 114 may send control signals to direct the seed laser 110 and/or the pulse-shaper 112 to provide a desired temporal profile of the seed light 104.

Figure 2:
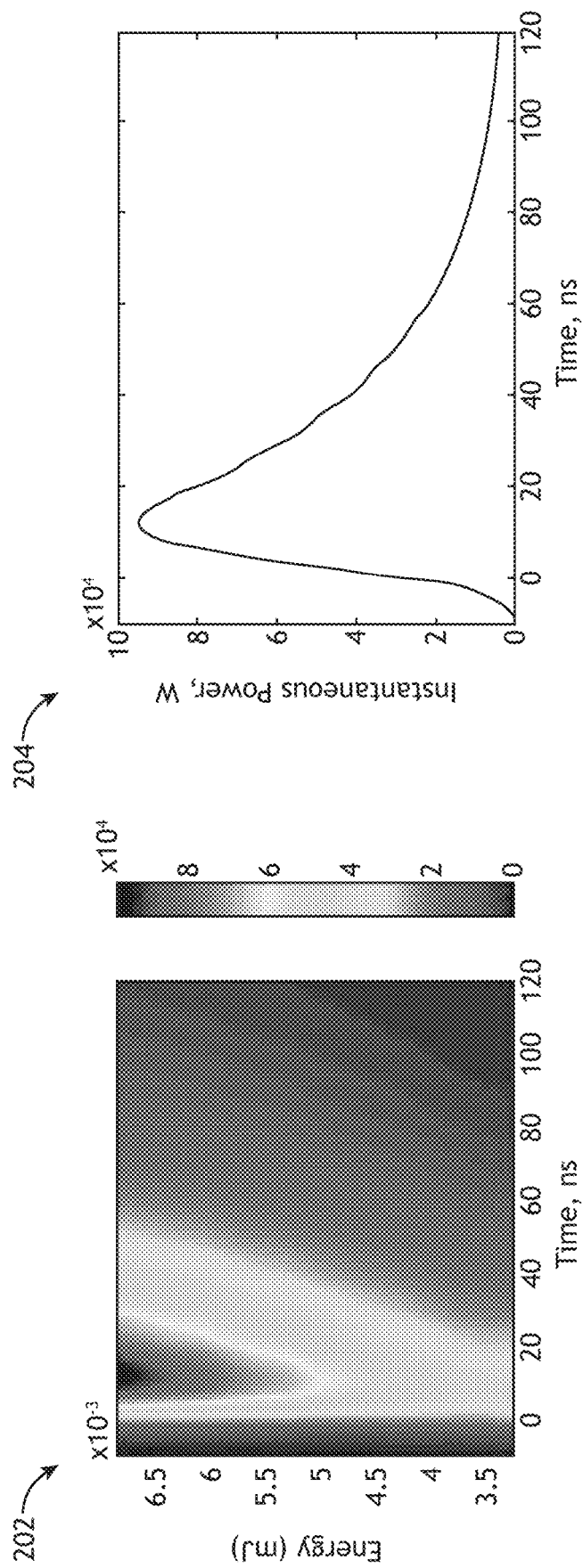
FIG. 2 includes a plot of an evolution of energy and a plot of instantaneous power of a seed pulse, in accordance with one or more embodiments of the present disclosure.
Figure 3:
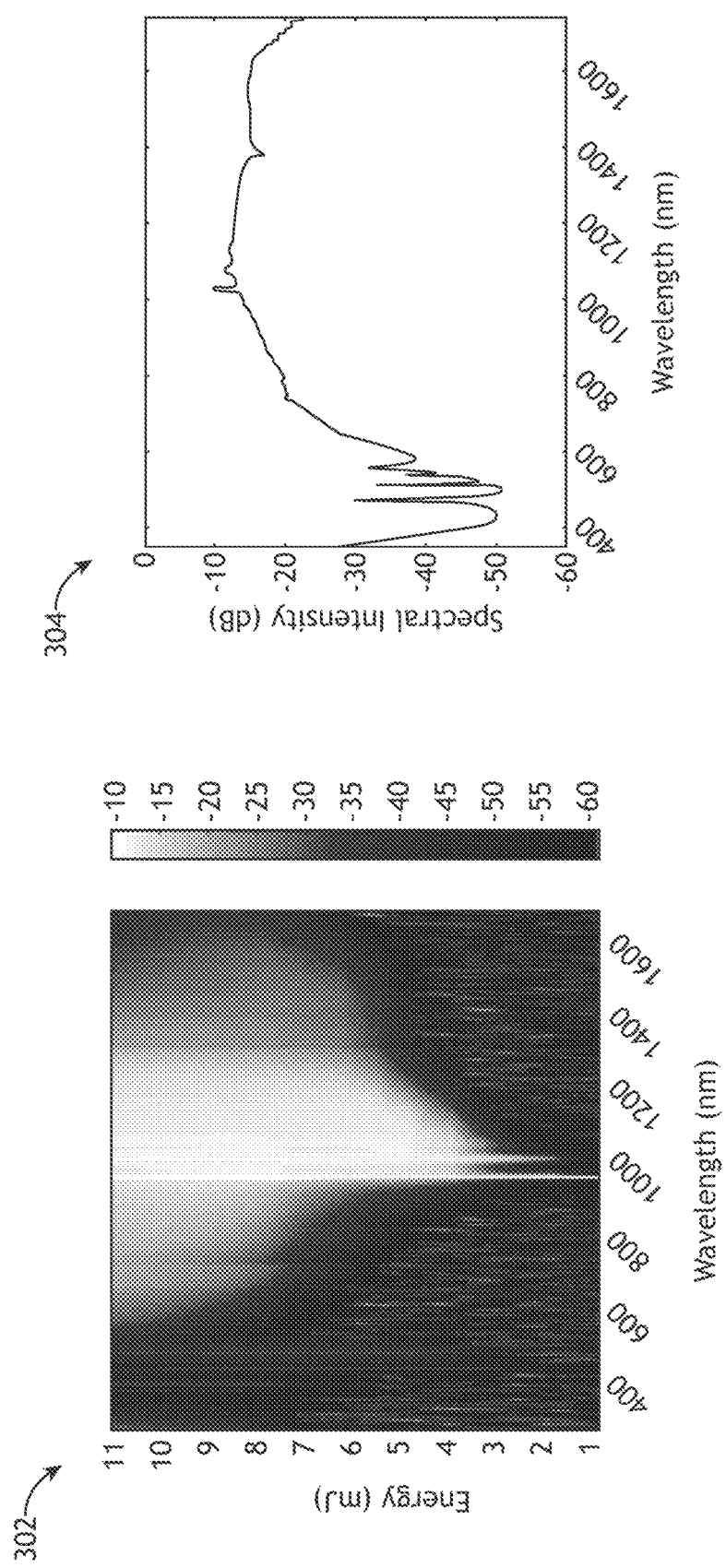
FIG. 3 includes a plot of spectral energy and a plot of spectral intensity of supercontinuum output light generated in a SIF optical fiber with seed light having the temporal profile illustrated in FIG. 2, in accordance with one or more embodiments of the present disclosure.
Figure 4:
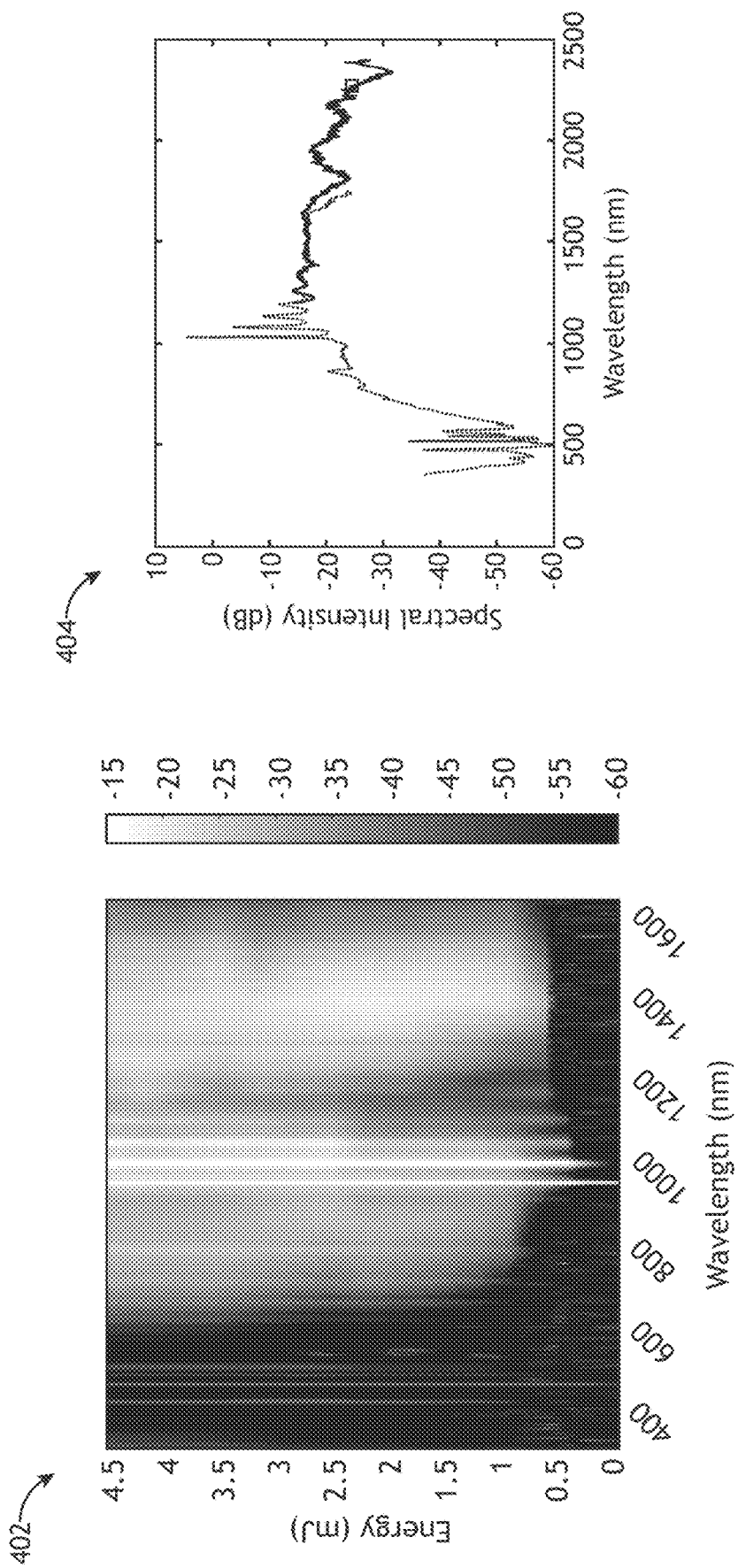
FIG. 4 includes a plot of spectral energy and a plot of spectral intensity of supercontinuum output light generated in a GIF optical fiber with seed light having the temporal profile illustrated in FIG. 2, in accordance with one or more embodiments of the present disclosure.

FIGS. 2-4 provide illustrative examples of the use of a non-standard seed light 104 temporal profile to generate high-power supercontinuum output light 108, in accordance with one or more embodiments of the present disclosure.

FIG. 2 includes a plot 202 of an evolution of energy and a plot 204 of instantaneous power of a seed pulse (e.g., a pulse of seed light 104), in accordance with one or more embodiments of the present disclosure. In particular, the plot 202 corresponds to instantaneous power plots similar to the plot 204 associated with different energies. The seed laser 110 used to generate the seed light 104 illustrated in FIG. 2 is a commercial cavity-dumped thin-disk seed laser 110 providing a wavelength around 1030 nm and repetition rates varying from 5 kHz to 100 kHz. As illustrated in FIG. 2, the temporal profile of the seed light 104 is characterized by an initial rise to a peak power level followed by a declining tail. It is contemplated herein that such a temporal profile is substantially different than ultrashort pulses typically used for supercontinuum generation.

FIG. 3 includes a plot 302 of spectral energy and a plot 304 of spectral intensity of the supercontinuum output light 108 generated in a SIF optical fiber 106 with the seed light 104 having the temporal profile illustrated in FIG. 2, in accordance with one or more embodiments of the present disclosure. In particular, the seed light 104 used to generate the supercontinuum output light 108 in FIG. 3 had a pulse energy of 11 mJ and a repetition rate of 20 kHz. Further, the optical fiber 106 was a custom 21 µm core, 72 µm pump cladding, 300 µm outer cladding triple clad fiber with a length of 12 m. The supercontinuum output light 108 included more than 170 W of power outside the pump band and represents extraordinary supercontinuum generation in the optical fiber 106. Further, no thermal scaling issues were present, indicating that the supercontinuum output light 108 with significantly higher powers is possible in this configuration.

It is noted that the generation of supercontinuum light is typically limited in a SIF, particularly when pumped in the normal dispersion regime. In this regime, a SIF typically only generates red-shifts associated with cascaded Raman scattering until the Raman shift crosses the ZDW. This phenomenon is observable in FIG. 3. However, the supercontinuum output light 108 nonetheless includes substantial visible light.

FIG. 4 includes a plot 402 of spectral energy and a plot 404 of spectral intensity of supercontinuum output light 108 generated in a GIF optical fiber 106 with seed light 104 having the temporal profile illustrated in FIG. 2, in accordance with one or more embodiments of the present disclosure. In particular, the seed light 104 used to generate the supercontinuum output light 108 in FIG. 4 had a pulse energy of 7.7 mJ and a repetition rate of 20 kHz. Further, the optical fiber 106 was a custom 175 µm core GIF with a 100 m length chosen to maximize the breadth of the supercontinuum output light 108 achievable before substantial background loss due to absorption in the optical fiber 106, particularly at wavelengths above 2 µm.

The supercontinuum output light 108 in FIG. 4 illustrates a broad, flat spectrum up to 2400 nm with more than 150 W of average power. Further, more than 80 W of this power (e.g., 4 mJ pulses at 20 kHz) was outside the high spectral intensity Stokes orders, making this the highest known energy demonstration of supercontinuum output light 108 in a GIF.

In addition to the exceptionally high average powers demonstrated in FIGS. 3 and 4, it is noted that the spectral profiles illustrated in FIGS. 3 and 4 illustrate evidence of the use of non-standard seed light 104. For example, as the instantaneous power of the seed light 104 varies slowly in time, only a small portion of the overall pulse energy reaches threshold for Stokes conversion at a specific input energy and fiber length. As the energy is increased and progressively later portions of the pulse reach this threshold, the previously converted sections of the pulse move to 2nd Stokes. This mechanism allows for the coexistence of multiple orders of Stokes in the same high brightness core. It is contemplated herein that this phenomenon is disallowed in CW-pumped fibers and may be tailored through dynamic control of the seed light 104 as disclosed herein.

Figure 1C:
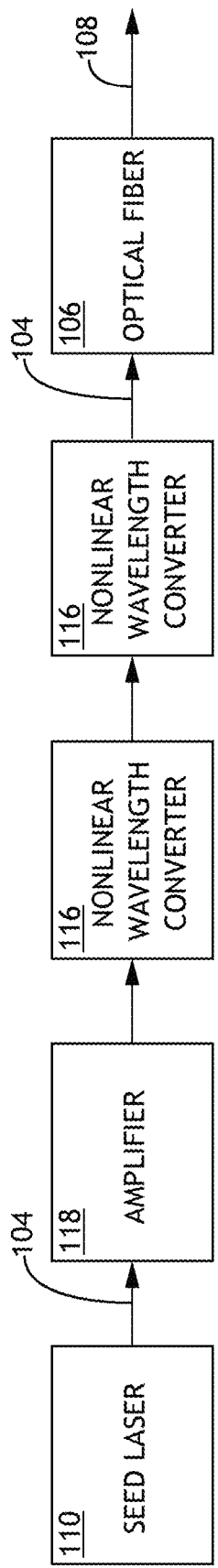
FIG. 1C is a conceptual block diagram of a seed light source including a seed laser providing seed light at a primary wavelength and two nonlinear wavelength converters providing second and third harmonics of the primary wavelength, in accordance with one or more embodiments of the present disclosure.
Figure 1D:
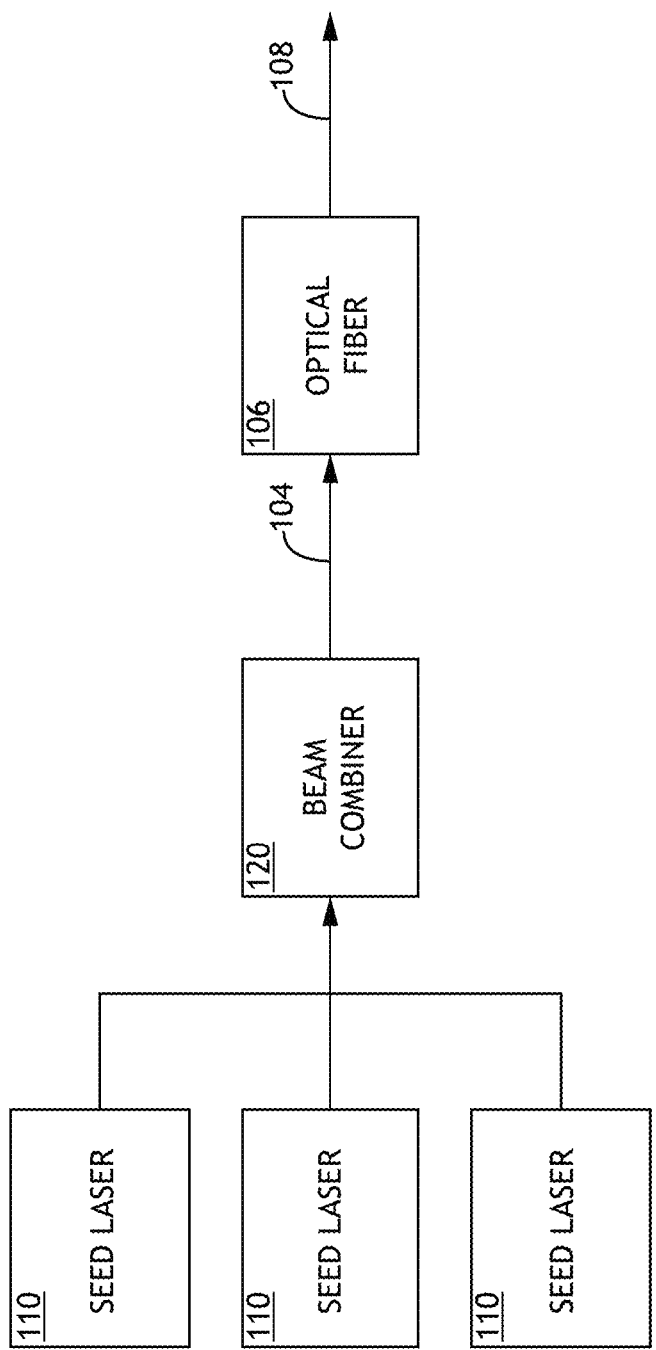
FIG. 1D is a conceptual block diagram of a seed light source including three seed lasers to separately generate seed light at different wavelengths and a beam combiner to combine the seed light from the three seed lasers into a common beam, in accordance with one or more embodiments of the present disclosure.

Referring again to FIG. 1A as well as FIGS. 1C and 1D, tailoring of the spectral properties of the supercontinuum output light 108 using seed light 104 with multiple wavelengths is described in greater detail in accordance with one or more embodiments of the present disclosure. It is recognized herein that the complex nonlinear dynamics that lead to supercontinuum generation from seed light 104 at a particular wavelength may often lead to uneven power spectral density in generated supercontinuum light. However, it is contemplated herein that pumping an optical fiber 106 with seed light 104 including multiple wavelengths or wavelength ranges may enable more precise tailoring of the resulting supercontinuum output light 108. Accordingly, in some embodiments, the seed light source 102 is capable of generating seed light 104 with multiple wavelengths or wavelength ranges. The seed light source 102 may further be capable of adjusting the relative powers of the various wavelengths in the seed light 104 as a mechanism for tailoring the spectrum of the generated supercontinuum output light 108. As a result, various aspects of the supercontinuum output light 108 may be selectively modified including, but not limited to, the spectral breadth, the spectral flatness, or the spectral shape more broadly.

The seed light source 102 may generate seed light 104 with multiple wavelengths using any technique known in the art.

In some embodiments, the seed light source 102 includes a seed laser 110 to generate seed light 104 at a primary wavelength and one or more nonlinear wavelength converters 116 (e.g., nonlinear crystals, or the like) suitable for modifying a wavelength of at least a portion of the seed light 104. For example, a nonlinear wavelength converter 116 may generate a harmonic of the primary wavelength.

As an illustration, FIG. 1C is a conceptual block diagram of a seed light source 102 including a seed laser 110 providing seed light 104 at a primary wavelength and two nonlinear wavelength converters 116 providing second and third harmonics of the primary wavelength, in accordance with one or more embodiments of the present disclosure. For instance, the seed laser 110 may generate seed light 104 at a primary wavelength of 1064 nm such that the nonlinear wavelength converters 116 may generate the seed light 104 at 532 nm and 355 nm, where all wavelengths are co-propagating along a common path. By changing the relative power in each wavelength, broad control over the spectral shape or flatness may be achieved across a broad spectral range. For instance, the relative power spectral density within various spectral regions of the supercontinuum output light 108 (e.g., ranges of 355-532 nm, 532-1064 nm, and 1064 nm+) may be selectively tuned by adjusting the power of the associated wavelength of the seed light 104.

In some embodiments, as also illustrated in FIG. 1C, the seed light source 102 may include an amplifier 118 to amplify the seed light 104 at the primary wavelength to provide additional power for harmonic generation.

It is contemplated herein that the configuration in FIG. 1C may be implemented in an all-fiber configuration and may further be implemented to provide co-propagating seed light 104 with multiple wavelengths in a single mode fiber. Further, the relative power in each of the wavelengths may be adjusted using various techniques such as, but not limited to, adjusting the alignment of the nonlinear wavelength converters 116 (e.g., an incident angle on a nonlinear crystal) or selecting between various available nonlinear wavelength converters 116.

In some embodiments, the seed light source 102 includes two or more seed lasers 110 providing seed light 104 with different wavelengths and a beam combiner 120 to combine the seed light 104 from the various seed lasers 110. The beam combiner 120 may include any type of optical element suitable for combining light with different wavelengths into a common beam such as, but not limited to, a wavelength division multiplexer or a dichroic optical element.

FIG. 1D is a conceptual block diagram of a seed light source 102 including three seed lasers 110 to separately generate seed light 104 at different wavelengths and a beam combiner 120 to combine the seed light 104 from the three seed lasers 110 into a common beam, in accordance with one or more embodiments of the present disclosure.

It is contemplated herein that the configuration in FIG. 1D may be particularly well-suited for, but is not limited to, providing seed light 104 at one or more arbitrary wavelengths at any desired power. For example, the seed light source 102 may include any number of seed lasers 110 proving any number of wavelengths of seed light 104. Further, the relative powers of each wavelength may be adjusted using various techniques including, but not limited to, adjusting the power of any of the seed lasers 110 directly or using filters, or by adjusting the beam combiner 120.

It is further contemplated herein that the tunable supercontinuum source 100 may implement multiple techniques to provide flexible spectral tuning of the supercontinuum output light 108. As an illustration, the tunable supercontinuum source 100 may include multiple seed lasers 110 providing different wavelengths of seed light 104, where the temporal profile of the seed light 104 from at least one of the seed lasers 110 is tunable (e.g., via a pulse-shaper 112 or through direct modulation).

Referring now generally to FIGS. 1A-4, dynamic tuning of the spectral properties of generated supercontinuum output light 108 may be implemented in various ways.

In some embodiments, various properties of the seed light 104 (e.g., temporal profiles, relative powers in different wavelengths, or the like), are selectable prior to run-time. In this way, supercontinuum output light 108 with a selected spectral profile may be generated for a particular application. In some embodiments, the various properties of the seed light 104 may be dynamically tuned during run-time (e.g., in real time) to provide dynamically tunable supercontinuum output light 108.

Additionally, as illustrated in FIG. 1A, the tunable supercontinuum source 100 may include a seed monitor 122 to monitor the spectrum of the supercontinuum output light 108 as a mechanism for providing feedback to the seed light source 102. For example, the seed monitor 122 may include one or more detectors arranged to capture the spectrum of the supercontinuum output light 108 such as, but not limited to, a spectroscopic detector or a dispersive element coupled with a detector array.

It is contemplated herein that the seed monitor 122 may facilitate the generation of tailored supercontinuum output light 108 in a variety of ways. For example, the seed monitor 122 may be used to detect drifts in the spectrum of the supercontinuum output light 108 over time such that the properties of the seed light 104 may be adjusted to compensate for the drifts. By way of another example, the seed monitor 122 may be used to develop correlations or other models relating properties of the seed light 104 to the spectrum of the supercontinuum output light 108, which may facilitate the precise generation of arbitrary spectral profiles. For instance, such correlations or other models, once trained, may be used to determine a set of properties of the seed light 104 that will generate an arbitrary desired spectral profile of the supercontinuum output light 108.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. A supercontinuum source comprising:
 a seed source providing seed light, wherein the seed source comprises:
  one or more seed lasers to generate the seed light; and
  a seed controller to adjust at least one of a temporal pulse profile or a wavelength of the seed light;
 an optical fiber to receive the seed light, wherein the seed source pumps the optical fiber to induce generation of supercontinuum output light, wherein a spectrum of the supercontinuum output light is controllable by adjusting at least one of the temporal pulse profile or the wavelength of the seed light with the seed controller to tailor a temporal profile of instantaneous power at one or more wavelengths available to contribute to one or more non-linear processes leading to spectral broadening in the optical fiber; and
 a seed monitor to monitor the spectrum of the supercontinuum output light, wherein the seed monitor is communicatively coupled to the seed controller to provide feedback to the seed controller for adjusting at least one of the temporal pulse profile or the wavelength of the seed light.

2. The supercontinuum source of claim 1, wherein the seed source pumps the optical fiber with the seed light in a normal dispersion regime to induce the generation of the supercontinuum output light via at least cascaded Raman scattering past a zero-dispersion wavelength of the optical fiber, wherein adjusting the temporal pulse profile of the seed light with the seed controller comprises:
 adjusting an instantaneous power of the seed light for a selected duration to adjust a relative amount of the seed light contributing to the cascaded Raman scattering for the generation of the supercontinuum output light for the selected duration.

3. The supercontinuum source of claim 1, wherein the seed controller comprises:
 at least one of an acousto-optic modulator or an electro-optic modulator to modulate an intensity of the seed light from at least one of the one or more seed lasers.

4. The supercontinuum source of claim 1, wherein the seed controller comprises:
 a gain modulator to modulate a gain of at least one of the one or more seed lasers.

5. The supercontinuum source of claim 1, wherein the seed light includes light within two or more spectral ranges, wherein the spectrum of the supercontinuum output light is adjustable by controlling at least one of the temporal pulse profile or a bandwidth of the light in the two or more spectral ranges.

6. The supercontinuum source of claim 5 wherein the one or more seed lasers comprise:
 two or more seed lasers providing the light with the two or more spectral ranges, wherein the seed source includes a beam combiner to combine the light from the two or more seed lasers to generate the seed light.

7. The supercontinuum source of claim 5 wherein the one or more seed lasers comprise:
 a single seed laser; and
 one or more nonlinear materials, wherein the two or more spectral ranges include a primary spectral range and one or more spectral ranges associated with harmonics of the primary spectral range generated by the one or more nonlinear materials.

8. The supercontinuum source of claim 1, wherein the temporal pulse profile of the seed light has a pulse duration greater than 1 nanosecond.

9. The supercontinuum source of claim 1, wherein the temporal pulse profile of the seed light has a pulse duration greater than 10 nanoseconds.

10. The supercontinuum source of claim 1, wherein the seed light has an average power of at least 100 Watts.

11. The supercontinuum source of claim 1, wherein the seed light has an average power of at least 200 Watts.

12. The supercontinuum source of claim 1, wherein the seed light from at least one of the one or more seed lasers has a wavelength of 1030 nm.

13. The supercontinuum source of claim 1, wherein the seed light from at least one of the one or more seed lasers has a wavelength of 1064 nm.

14. The supercontinuum source of claim 1, wherein the seed source comprises:
 an amplified laser source.

15. The supercontinuum source of claim 1, wherein the optical fiber comprises:
    a step-index fiber.
16. The supercontinuum source of claim 1, wherein the optical fiber comprises:
    a graded-index fiber.
17. The supercontinuum source of claim 1, wherein the optical fiber comprises:
    a single-mode fiber.
18. The supercontinuum source of claim 1, wherein the optical fiber comprises:
    a multi-mode fiber.
19. The supercontinuum source of claim 1, wherein the optical fiber comprises:
    a silica fiber.
20. The supercontinuum source of claim 1, wherein the optical fiber is undoped.
21. The supercontinuum source of claim 1, wherein the optical fiber is doped.
22. The supercontinuum source of claim 21, wherein the optical fiber is doped with germanium.
23. The supercontinuum source of claim 1, wherein the optical fiber receives the seed light in at least one of a cladding-pumped configuration or a core-pumped configuration.
24. The supercontinuum source of claim 1, wherein the seed controller adjusts relative amplitudes of one or more pulses of the seed light.
25. The supercontinuum source of claim 1, wherein the seed monitor detects drifts in the spectrum of the supercontinuum output light, wherein the seed controller adjusts at least one of the temporal pulse profile or the wavelength of the seed light to compensate for the drifts.
26. The supercontinuum source of claim 1, wherein the seed controller adjusts at least one of the temporal pulse profile or the wavelength of the seed light to provide a selected spectrum of the supercontinuum output light based on at least one of a correlation or a model relating at least one of the temporal pulse profile or the wavelength of the seed light to the spectrum of the supercontinuum output light.
27. The supercontinuum source of claim 26, wherein the at least one of the correlation or the model is developed at least in part by the feedback from the seed monitor.
28. A supercontinuum source comprising:
    a seed source providing one or more pulses of seed light with an adjustable temporal pulse profile, wherein the seed source comprises:
        one or more seed lasers to generate the seed light; and
        a seed controller to adjust the temporal pulse profile of at least one of the one or more pulses of the seed light; and
    an optical fiber to receive the seed light, wherein the seed source pumps the optical fiber to induce generation of supercontinuum output light, wherein a spectrum of the supercontinuum output light is controllable by adjusting the temporal profile of the at least one of the one or more pulses of the seed light with the seed controller to tailor a temporal profile of instantaneous power available to contribute to one or more non-linear processes leading to spectral broadening in the optical fiber.
29. The supercontinuum source of claim 28, wherein the one or more non-linear processes leading to the spectral broadening in the optical fiber include cascaded Raman scattering, wherein the seed source pumps the optical fiber with the seed light in a normal dispersion regime to induce the generation of the supercontinuum output light via at least cascaded Raman scattering past a zero-dispersion wavelength of the optical fiber.
30. The supercontinuum source of claim 29, wherein adjusting the temporal pulse profile of the at least one of the one or more pulses of the seed light with the seed controller comprises:
    adjusting an instantaneous power of the at least one of the one or more pulses of the seed light for a selected duration to adjust a relative amount of the seed light contributing to the cascaded Raman scattering for the generation of the supercontinuum output light for the selected duration.
31. The supercontinuum source of claim 28, wherein the seed controller comprises:
    at least one of an acousto-optic modulator or an electro-optic modulator to modulate an intensity of the seed light from at least one of the one or more seed lasers.
32. The supercontinuum source of claim 28, wherein the seed controller comprises:
    a gain modulator to modulate a gain of at least one of the one or more seed lasers.
33. The supercontinuum source of claim 28, wherein at least one of the one or more seed lasers comprises:
    an amplified laser source.
34. The supercontinuum source of claim 28, wherein the seed controller adjusts relative amplitudes of one or more pulses of the seed light.
35. The supercontinuum source of claim 28, wherein adjusting the temporal pulse profile of the at least one of the one or more pulses of the seed light with the seed controller comprises:
    adjusting an instantaneous power of the at least one of the one or more pulses of the seed light to provide for multiple orders of Stokes light in the optical fiber.
36. The supercontinuum source of claim 28, wherein adjusting the temporal pulse profile of the at least one of the one or more pulses of the seed light with the seed controller comprises:
    adjusting a shape of a tail of the instantaneous power of the at least one of the one or more pulses of the seed light relative to an initial rise of the instantaneous power.
37. A supercontinuum source comprising:
    a seed source providing seed light within two or more spectral ranges, wherein the seed source comprises:
        one or more seed lasers to generate the seed light; and
        a seed controller to adjust a relative ratio of the seed light within the two or more spectral ranges; and
    an optical fiber to receive the seed light, wherein the seed source pumps the optical fiber to induce generation of supercontinuum output light, wherein a spectrum of the supercontinuum output light is controllable by adjusting the relative ratio of the seed light within the two or more spectral ranges with the seed controller.
38. The supercontinuum source of claim 37, wherein the seed source pumps the optical fiber with the seed light in a normal dispersion regime to induce the generation of the supercontinuum output light via at least cascaded Raman scattering past a zero-dispersion wavelength of the optical fiber.
39. The supercontinuum source of claim 37, wherein the seed light includes light within the two or more spectral ranges, wherein the spectrum of the supercontinuum output light is adjustable by controlling at least one of a temporal pulse profile or a bandwidth of the light in the two or more spectral ranges.

40. The supercontinuum source of claim 37, wherein the one or more seed lasers comprise:
two or more seed lasers providing the light with the two or more spectral ranges, wherein the seed source includes a beam combiner to combine the light from the two or more seed lasers to generate the seed light.

41. The supercontinuum source of claim 37, wherein the one or more seed lasers comprise:
a single seed laser; and
one or more nonlinear materials, wherein the two or more spectral ranges include a primary spectral range and one or more spectral ranges associated with harmonics of the primary spectral range generated by the one or more nonlinear materials.

42. The supercontinuum source of claim 37, wherein at least one of the one or more seed lasers comprises:
an amplified laser source.

43. The supercontinuum source of claim 37, wherein the seed controller adjusts a temporal pulse profile of one or more pulses of the seed light.

44. The supercontinuum source of claim 37, wherein the seed controller adjusts relative amplitudes of one or more pulses of the seed light.

\* \* \* \* \*